Oct. 19, 1971  B. K. SHULL  3,613,480

POWER TRANSMISSION HAVING DOWNSHIFT INHIBITOR

Filed July 13, 1970  3 Sheets-Sheet 1

INVENTOR:
BRADFORD K. SHULL
BY: James E. Nilles
ATTORNEY

INVENTOR:
BRADFORD K. SHULL
BY: James E. Nilles
ATTORNEY

Oct. 19, 1971     B. K. SHULL     3,613,480

POWER TRANSMISSION HAVING DOWNSHIFT INHIBITOR

Filed July 13, 1970     3 Sheets-Sheet 3

INVENTOR:
BRADFORD K. SHULL

BY: *James E. Miller*

ATTORNEY

United States Patent Office 3,613,480
Patented Oct. 19, 1971

3,613,480
POWER TRANSMISSION HAVING DOWNSHIFT INHIBITOR
Bradford K. Shull, Rockford, Ill., assignor to Twin Disc, Incorporated, Racine, Wis.
Filed July 13, 1970, Ser. No. 54,316
Int. Cl. F16h 3/44, 33/00, 67/00
U.S. Cl. 74—733
6 Claims

ABSTRACT OF THE DISCLOSURE

A transmission of the type having a torque converter that can be engaged in direct drive through a direct drive clutch whenever the speed of the engine is at a rated speed, and in which the transmission should not be downshifted if it is operating at too fast a speed because of possible damage to the engine and transmission. A downshift inhibitor is provided for such a transmission and includes a fluid actuated brake and a one-way clutch connected with the speed selector shifting lever whereby the lever can be shifted in the upshift direction but the brake retards the lever against downshifting when the transmission is operating over a predetermined speed. The fluid brake on the downshift inhibitor is actuated by the same fluid pressure that actuates the direct drive clutch. Thus, the downshift inhibitor includes a one-way clutch and a fluid brake that work together automatically to indicate to the operator of the vehicle when it is unsafe to downshift.

BACKGROUND OF THE INVENTION

The present invention relates to a power transmission, including a torque converter, for transmitting power from an engine to the vehicle wheels. Under certain circumstances, the torque converter may be connected in direct drive whenever the engine speed is sufficiently high and since there is then virtually no torque multiplication, it is more economical to use direct drive whenever possible. However, when operating in direct drive, the transmission should not be downshifted if it is operating too fast because of possible damage to the engine and transmission resulting from over-speeding of these elements.

The present invention is in the nature of an improvement over the U.S. Pat. No. 3,259,218, which issued July 5, 1966 to Black et al. for "Power Transmission," which patent has been assigned to an assignee common with the present application.

SUMMARY OF THE PRESENT INVENTION

The present invention provides a torque converter transmission having a downshift inhibitor which includes a speed selector shifting lever, and a fluid actuated brake and one-way clutch for said lever which work together automatically to indicate to the operator when it is safe to downshift the speed of the vehicle. The transmission input is driven through an engaged clutch forming a direct drive for the torque converter, and the fluid operated brake on the shifting lever is actuated by the same pressure fluid that actuates this direct drive clutch.

More specifically, the downshift inhibitor includes a one-way clutch that can be shifted in the upshift direction, but is retarded in being shifted in the downshift direction under certain circumstances, such retarding being accomplished by the fluid actuated brake connected to the shifting lever.

These and other objects and advantages of the present invention will appear hereinafter as this disclosure progresses, reference being made to the accompanying drawings.

DESCRIPTION OF A PREFERRED EMBODIMENT

Figure 1:
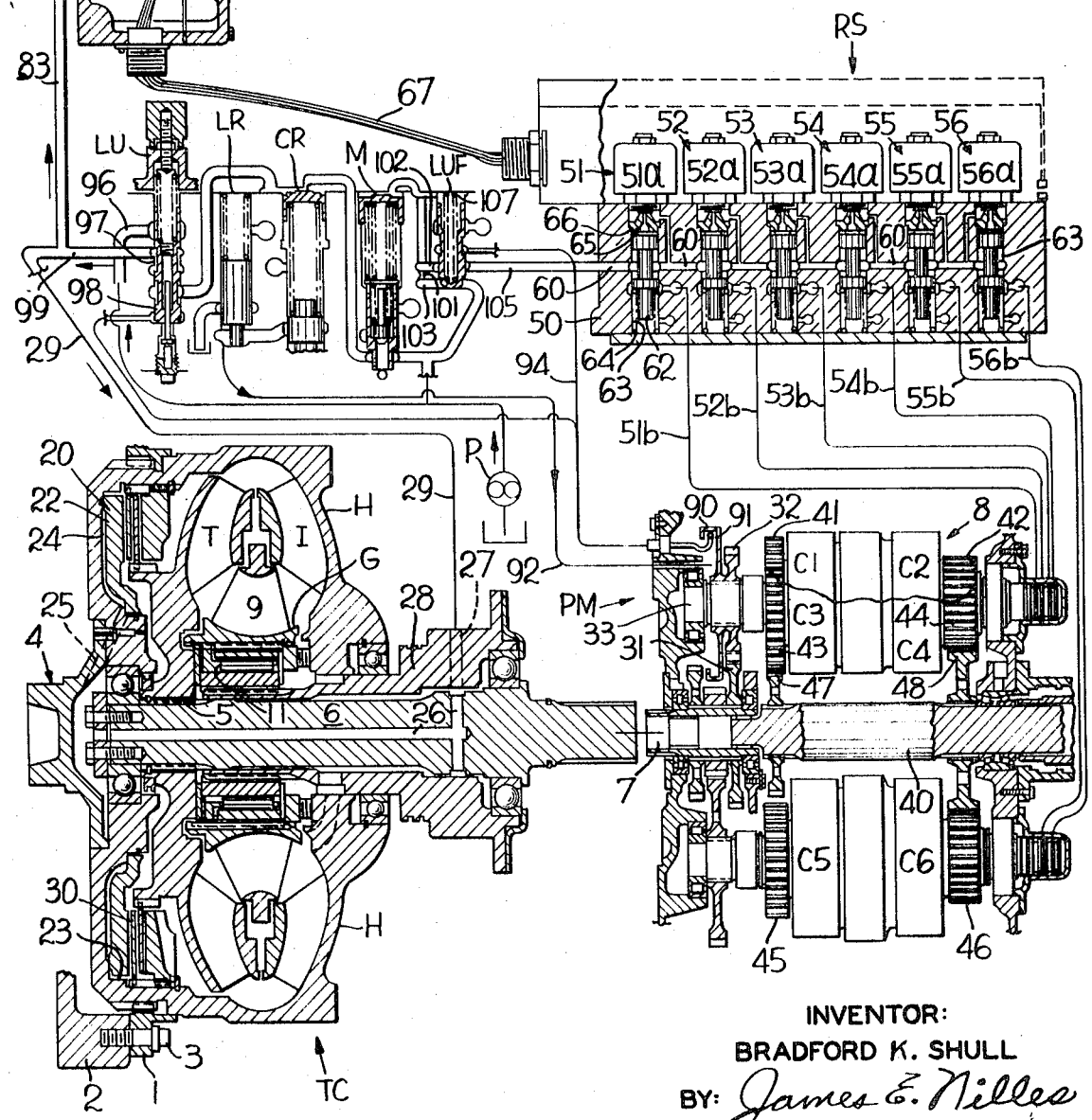
FIG. 1 is a schematic view showing the invention as applied to a torque converter transmission.
Figure 3:
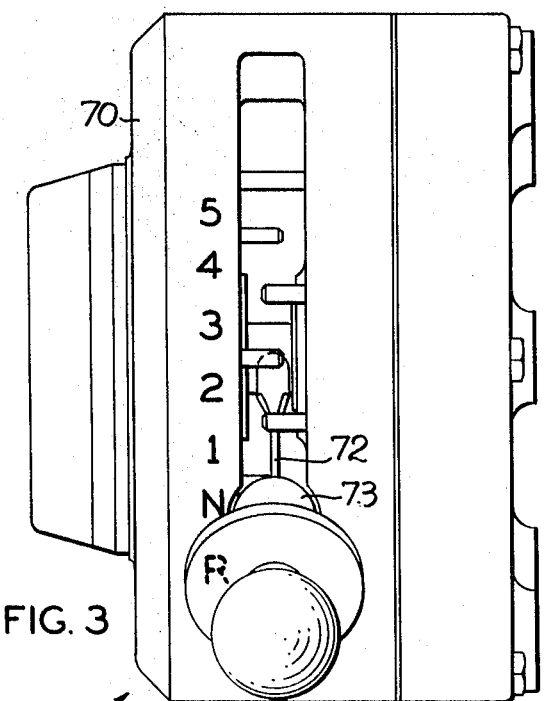
FIG. 3 is a plan view of the device shown in FIG. 2.
Figure 4:
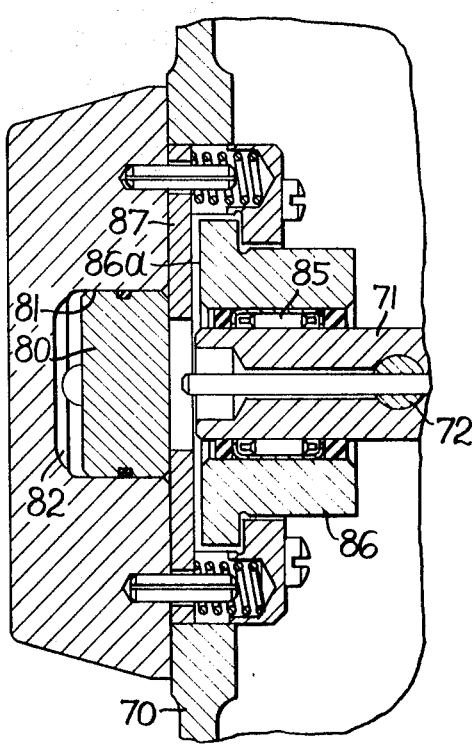
FIG. 4 is a sectional view taken along the line 4—4 in FIG. 2, but on an enlarged scale.
Figure 2:
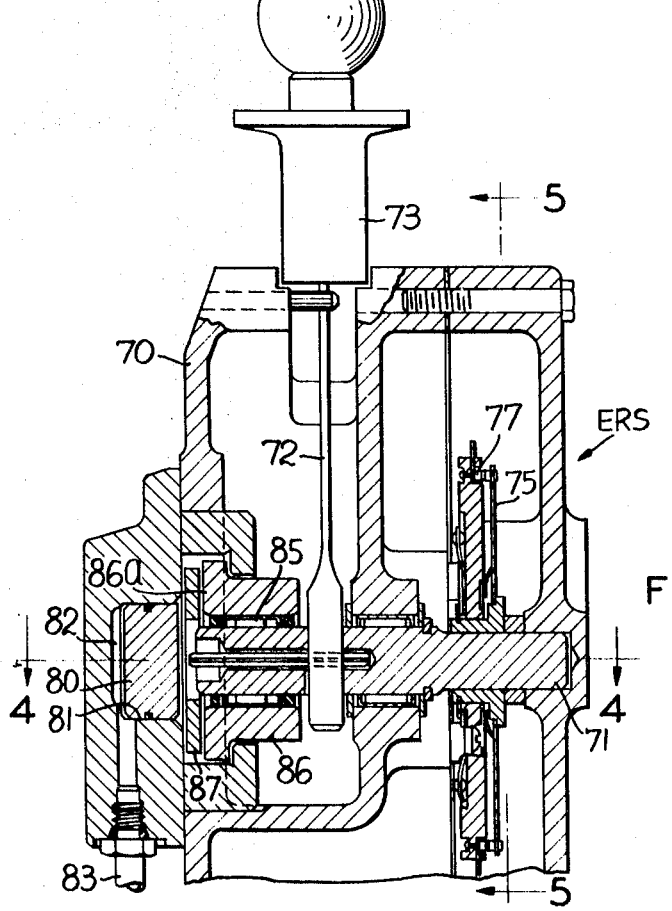
FIG. 2 is an enlarged, fragmentary view of a portion of the control device shown in FIG. 1.
Figure 5:
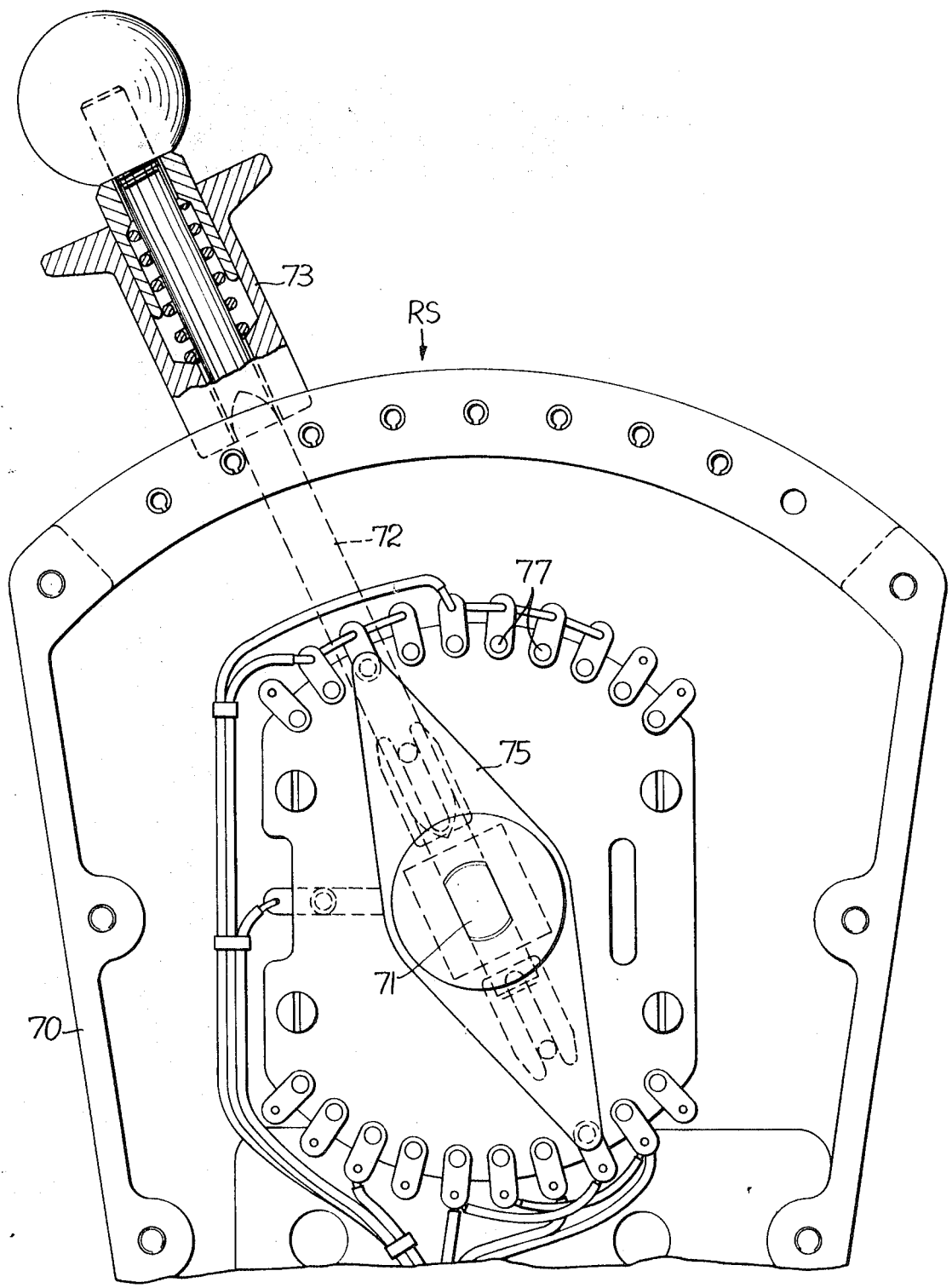
FIG. 5 is an enlarged sectional view taken generally along the line 5—5 in FIG. 2.

The power transmission shown for purposes of illustrating the invention includes an internal combustion engine E that drives the conventional-type torque converter TC which has an internally toothed driving ring 1 that is bolted to an engine flywheel 2 by bolt means 3. The flywheel is piloted on diameter 4 and the engine drives the housing H of the torque converter in the known manner. The impeller assembly I is fixed to the housing for rotation therewith. In this manner, the engine flywheel driving ring, rotating housing, and the impeller assembly all rotate at engine speed and direction.

When the transmission is in converter drive, that is, when the converter is used as a torque multiplier, the fluid is moved by the impeller I and directed against the blades of the turbine assembly T which is spline connected as at 5 to the converter output shaft 6. Shaft 6 in turn transmits drive power to the input sleeve 7 of shift mechanism 8. After the fluid passes the turbine blades, it is redirected to the impeller blades by the blades 9 of the guide assembly G which is mounted on a freewheel assembly 11.

Converter drive serves three main conditions; (1) to move the vehicle from a standstill, initially; (2) to provide a high output torque over a broad speed range for operation in adverse areas; and (3) to function as a shock damper during each speed shift.

When the output torque requirements exceed input torque from the engine E, the freewheel assembly 11 for the guide assembly G is locked. When the output requirements are equal to, or less than, input torque, the guide assembly freewheels.

A fluid actuated, lock-up clutch 20 is provided between the housing H and the turbine assembly T so that the torque converter TC is in direct drive with the power flow through the driving ring 1, housing H, lock-up clutch 20, turbine wheel assembly T, and converter output shaft 6. Under this condition, the impeller I, turbine T and freewheeling guide G rotate as a unit.

The lock-up clutch 20 includes a piston 22 slideable in a cylinder 23 formed in the housing H and defining an expansible, pressurizable, clutch actuating chamber 24. Fluid passage 25 in the housing, passage 26 in the shaft, passage 27 in the guide wheel carrier 28, and conduit 29 act to conduct fluid from a lockup valve LU, to be described later.

When the valve LU permits pressurized fluid to flow to the clutch actuating chamber 24, the piston 22 causes clamp up of the conventional interleaved, friction plates 30 located between the housing H and the turbine assembly T, thus causing direct drive through the torque converter.

The converter output shaft 6 transmits the drive to speed changing gear shift mechanism 8. More specifically, shaft 6 drives the input sleeve 7 of the mechanism. A drive gear 31 is spline-connected to the input sleeve and meshes with gear 32 fixed to shaft 33 on which range clutches C1 and C2 are mounted. Each clutch C1 through C6 has a respective gear 41, 42, 43, 44, 45 and 46 which mesh with gears 47 and 48 fixed to shaft 40. Thus the power flow is through a selected combination of these clutches, and then to the output shaft 40. The selection is made by the selector valve, to be described.

Hydraulic range valves

The transmission range selector valve assembly RS provides six positions—five forward and one reverse. First range position permits drive through the converter and first speed gear train only. All other forward range positions provide converter drive at low and medium turbine output speeds, but provide automatic shifting to direct drive at a predetermined turbine output speed setting. As a result of the action of the lock-up flow sensing valve LUF, the converter always automatically changes from direct drive to converter drive whenever a shift is made. The one reverse position of the range selector valve provides converter drive through the reverse gear train only.

The range selector valve assembly RS includes a body 50 containing six solenoid controlled range valves 51, 52, 53, 54, 55 and 56 each having a fluid passage 60 for main pressure delivered by the lock-up valve LU. The valves each have balanced spools 62 located in bore 63 and a return spring 64. Solenoids 51a, 52a, 53a, 54a, 55a and 56a are provided, one for operating each valve. These solenoids are conventional and each have orifice control armature plungers 65 located over their respective valve seats 66. The solenoid operated valves thus permit fluid to flow to the selected clutches to select the desired speed range and direction for the vehicle. The solenoid lead wires 67 are connected to the electric range selector ERS, to be descrbied. Conduits 51b, 52b, 53b, 54b, 55b and 56b place their respective solenoid valves in fluid delivering communication with the respective hydraulically actuated friction clutches C1, C2, C3, C4, C5, and C6.

Electric range selector

The electric range selector ERS is mounted convenient to the vehicle operator and includes a housing 70 in which a shift lever shaft 71 is journalled. A speed selector means in the form of a shift lever 72 is fixed to the shaft 71 and extends from the housing where it has a sleeve detent 73 shiftably mounted thereon. A multiple tap rotary switch 75 is connected to the shaft 71 for oscillation therewith and contact with the appropriate terminal taps 77 which are so-located in a circumferential manner, that through the selected gear train the lever range positions, coincide with the proper ciricuit closing position to the range valve solenoid.

In accordance with the present invention, a downshift inhibitor is provided to automatically indicate to the operator when it is safe to downshift the speed of the vehicle. This inhibitor includes a fluid operated brake for the shifting lever comprising a piston 80 that is shiftable within a cylinder 81 formed in the housing 70 of the range selector. Thus, an expansible and pressurizable chamber 82 is formed between the piston and cylinder and to which chamber is provided with pressurized fluid via conduit 83. Conduit 83 communicates with the discharge side of the lock-up valve LU. The inhibitor also includes a one-way roller clutch 85 which is located between the shaft 71 and an annular collar 86. The collar 86 has a braking surface 86a against which a pressure plate 87 is adapted to be firmly engaged with the piston for shifting to the right as viewed in the drawings due to pressurization of chamber 82.

Thus, the one-way roller clutch and fluid brake work together automatically to indicate to the operator when it is unsafe to downshift. As previously mentioned, an undesirable downshift condition exists when the torque converter is in direct drive. This condition is where the engine drives the transmission input through an engaged clutch. The torque converter is engaged in direct drive automatically whenever the engine is at rated speed and the input to the transmission is about .9 engine speed. The fluid brake provided by piston 80 on the downshift inhibitor is actuated by the same fluid pressure that actuates the drive clutch 20 of the torque converter.

With the downshift inhibitor above described, the lever can be shifted in the up-shift direction due to the action of the one-way clutch, but lever movement is retarded in the downshift direction under the above certain circumstances, such retarding being provided by the fluid actuated brake connected to the shifting lever.

Hydraulic system

The fluid pressure system includes the previously mentioned range selector valve RS, the lock-up valve LU, a lubrication regulator valve LR, a converter regulator valve CR, a main valve M, and a lock-up flow valve LUF.

Also provided is a means for sensing or measuring the speed of the torque converter. This means takes the form of a pitot means PM which includes a spinner member 90 that is mounted for rotation with the transmission, for example by being mounted with gear 32 driven from input shaft of the transmission. The member 90 has a radial pocket 91 formed therein to which fluid is supplied via conduit 92 through the fluid lubrication valve LR. Thus when the speed of the transmission input is such that a sufficiently high head of fluid is formed in the chamber 91, this fluid pressure head is transmitted via conduit 94 to the end of the lock-up valve LU. This pressure then causes the lock-up valve to shift in its bore and permits pressure fluid from pump P to flow via the main pressure conduit 96, the groove 97 in the spool 98 of the lock-up valve and then out passage 99 of the valve. The fluid then flows both to the chamber 82 of the downshift inhibitor brake and also flows via passage 29 to the torque converter lock-up clutch.

Thus, when the torque converter output has reached a certain speed as reflected in the pitot means, the pressure fluid from the pitot is used to shift the lock-up valve, thereby permitting pressure fluid to flow both to the downshift inhibitor brake and to the torque converter lock-up clutch. In this manner, the torque converter is placed in direct drive and at the same time the operator is discouraged from downshifting due to the inhibitor.

When the turbine speed of the torque converter then decreases to a certain amount, as reflected in the pitot means, the lock-up valve LU moves in the opposite direction and cuts off main pressure from the lock-up clutch 20 and the downshift inhibitor brake.

Referring again to the lock-up flow valve LUF, an orifice 101 is provided between passage 102 and passage 103. If the transmission is being upshifted, there will be fluid flow in the clutch supply line 105 which leads from the lock-up flow valve to the range selector valve RS. This flow causes the lock-up flow valve to shift against the action of its biasing spring 107 to thereby permit a large supply of pressure fluid to pass and also dump the pressure from the pitot means via conduit 94.

After the upshift is completed, the lock-up flow valve LUF returns to the position shown. However, turbine speed of the torque converter has decreased so that the converter will not go into lock-up position again until the vehicle speed, that is the turbine speed, has increased, to thereby again build up pressure in the pitot means and consequently again shift the lock-up valve LU.

Without the downshift inhibitor provided by the present invention, if the operator downshifted when the torque converter was locked up, the lock-up flow valve LUF will move to dump the pressure in the pitot means and disengage the lock-up clutch 20, but the turbine speed of the converter will increase due to the ratio change and the pitot means pressure will immediately re-engage the lock-up clutch and over-speed the engine. Thus, the downshift inhibitor provided by the present invention prevents the damage which would otherwise be caused by this over-speed of the engine.

What is claimed is:
1. A torque converter transmission having a torque converter driven by an engine, speed changing gear shift mechanism driven by said torque converter, and a fluid actuated lock-up clutch for releasably locking the torque converter in direct drive, selector valve means for selectively shifting said gear shift mechanism, speed selector means shiftable in upshifting and downshifting directions for actuating said selector valve means, a fluid operated brake engageable with said speed selector means for retarding shifting thereof in the downshifting direction, a one-way clutch connected between said brake and said selector means for permitting upshifting of said selector means when said brake engages said selector means, and a lock-up fluid valve in fluid communication with both said brake and said lock-up clutch for directing fluid to cause locking engagement of said brake and lock-up clutch.

2. The transmission set forth in claim 1 further characterized in that said speed selector means includes a manually operated lever assembly and electric switch means, said brake is engageable with said lever assembly, said one-way clutch is operatively located between said brake and said lever assembly, and said selector valve means includes fluid directing valves and solenoids for actuating said valves, and said electric switch means are electrically connected to said solenoids for actuation thereof.

3. The transmission as claimed in claim 1 including speed sensing means for said torque converter and connected to said lock-up fluid valve for actuation thereof when the speed of the torque converter exceeds a predetermined value to thereby cause engagement of said brake and retardation of downshifting of said speed selector means.

4. The transmission as claimed in claim 2 including speed sensing means for said torque converter and connected to said lock-up fluid valve for actuation thereof when the speed of the torque converter exceeds a predetermined value to thereby cause engagement of said brake and retardation of downshifting of said speed selector means.

5. A torque converter transmission for a vehicle having an engine, said transmission having a rotating housing torque converter driven by said engine, speed changing gear shift mechanism driven by said torque converter, and a fluid actuated lock-up clutch for releasably locking the torque converter in direct drive, hydraulic valve means for selectively shifting said gear shift mechanism to increase or decrease the speed of said vehicle, speed selector means shiftable in speed increasing and decreasing directions for actuating said hydraulic valve means, a fluid operated brake engageable with said selector means for retarding shifting thereof in the speed decreasing direction, a one-way clutch connected between said brake and said selector means for permitting shifting of said selector means in the speed increasing direction when said brake engages said selector means, and a lock-up hydraulic valve in fluid communication with both said brake and said lock-up clutch and arranged so that when the speed of the converter reaches a predetermined value, (1) the lock-up clutch is engaged to lock said converter in direct drive and (2) the brake engages said selector means to retard shifting thereof in the speed decreasing direction.

6. A torque converter transmission for a vehicle having an engine, said transmission having a rotating housing torque converter, said converter having a housing driven by said engine and also having an output shaft, speed changing gear shift mechanism driven by said torque converter output shaft, and a fluid actuated lock-up clutch for releasably locking the torque converter housing to said shaft for a direct drive, solenoid operated hydraulic valve means including solenoids for selectively shifting said gear shift mechanism to increase or decrease the speed of said vehicle, manually operated, electric speed selector means shiftable in speed increasing and decreasing directions for actuating said solenoids to consequently actuated hydraulic valve means, a fluid operated brake engageable with said speed selector means for retarding shifting thereof in said speed decreasing direction, a one-way clutch connected between said brake and said selector means and arranged to permit shifting of said selector means in the speed increasing direction when said brake engages said selector means, and a lock-up hydraulic valve in fluid communication with both said brake and said lock-up clutch and arranged so that when the speed of the converter reaches a pre-determined value, (1) the lock-up clutch is engaged to lock said converter in direct drive and (2) the brake engages said selector means to retard shifting thereof in the speed decreasing direction.

References Cited

UNITED STATES PATENTS 3,073,179   1/1963   Christenson _____ 74—733 X

LEONARD H. GERIN, Primary Examiner

U.S. Cl. X.R.

192—3.31, 3.57

UNITED STATES PATENT OFFICE
CERTIFICATE OF CORRECTION

Patent No. 3,613,480　　　　　　　　　　Dated October 19, 1971

Inventor(s) Bradford K. Shull

It is certified that error appears in the above-identified patent and that said Letters Patent are hereby corrected as shown below:

After line 14 in column 2, insert ---ing the present invention includes a rotating housing---

Signed and sealed this 12th day of September 1972.

(SEAL)
Attest:

EDWARD M. FLETCHER, JR.　　　　　　　ROBERT GOTTSCHALK
Attesting Officer　　　　　　　　　　　Commissioner of Patents